(No Model.)

A. T. KINGSLEY.
NUT LOCK.

No. 259,552.  Patented June 13, 1882.

WITNESSES
J. E. Clark.
W. J. Osgood.

INVENTOR
Alba T. Kingsley.
p. Howard A. Low,
Attorney

UNITED STATES PATENT OFFICE.

ALBA T. KINGSLEY, OF MILLPORT, NEW YORK.

NUT-LOCK.

SPECIFICATION forming part of Letters Patent No. 259,552, dated June 13, 1882.

Application filed April 26, 1882. (No model.)

*To all whom it may concern:*

Be it known that I, ALBA T. KINGSLEY, a citizen of the United States, residing at Millport, in the county of Chemung and State of New York, have invented certain new and useful Improvements in Nut-Locks, of which the following is a specification, reference being had therein to the accompanying drawings.

My invention relates to nut-locks, the construction and operation of which will be hereinafter fully set forth.

Figure 1:
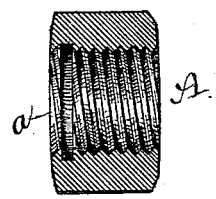
Figure 2:
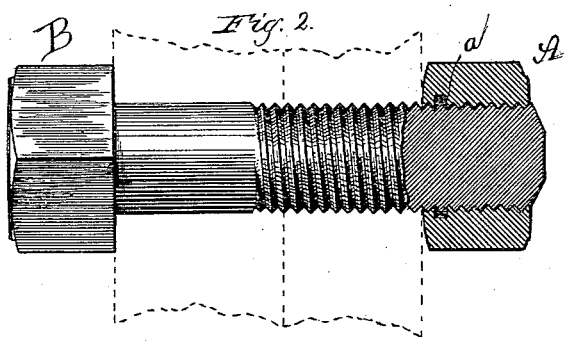

In the drawings, Figure 1 is a vertical section of a nut with my lock formed in it, and Fig. 2 of a bolt and nut constructed according to my invention.

A represents a nut, and has running through it the usual threaded hole. Cut around the lower or portion of the hole nearest the bearing-surface of the nut is an annular groove, *a*, as shown. The object of this groove is to secure a displacement of metal for the purposes hereinafter to be set forth. The bearing-surface of the nut is beveled from the edge of the hole to the sides of the nut, as shown, so that the metal around the hole is first to come in contact with the plates secured together by the bolt and nut. The bolt B is of ordinary design.

In the operation of the locking device the bolt is placed through the plates to be fastened together, and the nut is screwed down upon its projecting end. When the bearing-surface of the nut reaches the plate the metal around the sides will strike first. The nut is then in proper position to lock, which is accomplished by screwing it tightly upon the plate. This forces the metal between the groove and bearing-surface tightly around the threads of the bolt, thus locking the nut firmly in its place. A very small amount of pressure only is necessary to accomplish the result, and when the nut is removed the locked portion of the nut will spring back to its normal position.

What I claim is—

1. A nut-lock consisting of a nut provided with an interior annular groove, *a*, situated near its bearing-surface, and having said bearing-surface beveled from the edges of the hole to the sides of the nut, substantially as shown and described.

2. In a nut-lock, the combination of the nut A, provided with an interior annular groove, *a*, and having its bearing-surface beveled, with the bolt B and plates to be secured together, substantially as described.

In testimony whereof I affix my signature in presence of two witnesses.

ALBA T. KINGSLEY.

Witnesses:
WM. B. BOTSFORD,
J. ROZEKRUNS.